US012799375B2

(12) United States Patent
Veeraraghavan et al.

(10) Patent No.: US 12,799,375 B2
(45) Date of Patent: Nov. 17, 2026

(54) ELECTROMAGNETIC CURABLE NOVEL TOUGHENED EPOXY-HYBRID STRUCTURAL ADHESIVES AND APPLICATIONS USING THE SAME

(71) Applicants: Thanikaivelan Tindivanam Veeraraghavan, Newburgh, IN (US); Ramanathan Lakshminarayan, Newburgh, IN (US)

(72) Inventors: Thanikaivelan Tindivanam Veeraraghavan, Newburgh, IN (US); Ramanathan Lakshminarayan, Newburgh, IN (US)

(73) Assignee: Uniseal, Inc., Evansville, IN (US)

( * ) Notice: Subject to any disclaimer, the term of this patent is extended or adjusted under 35 U.S.C. 154(b) by 31 days.

(21) Appl. No.: 18/901,501

(22) Filed: Sep. 30, 2024

(65) Prior Publication Data

US 2025/0051620 A1 Feb. 13, 2025

Related U.S. Application Data

(63) Continuation of application No. 17/403,941, filed on Aug. 17, 2021, now Pat. No. 12,110,425.

(51) Int. Cl.
*C09J 163/00* (2006.01)
*C08G 59/50* (2006.01)
(Continued)

(52) U.S. Cl.
CPC ............ *C09J 163/00* (2013.01); *C08G 59/54* (2013.01); *C08K 3/04* (2013.01); *C08K 3/36* (2013.01);
(Continued)

(58) Field of Classification Search
CPC ................ C09J 163/00; C09J 2301/416; C09J 2301/408; C08G 59/54; C08G 59/50; C08K 3/04; C08K 3/36; C08L 75/04
(Continued)

(56) References Cited

U.S. PATENT DOCUMENTS 3,591,438 A 7/1971 Toback et al.
3,686,359 A 8/1972 Soldatos et al.
(Continued)

FOREIGN PATENT DOCUMENTS

CN 102159615 10/2014
CN 104479607 3/2017
(Continued)

OTHER PUBLICATIONS

Office Action for U.S. Appl. No. 17/403,941 dated Jan. 18, 2023.
Office Action for U.S. Appl. No. 17/403,941 dated Sep. 29, 2023.
Office Action for U.S. Appl. No. 17/403,941 dated Feb. 15, 2024.

*Primary Examiner* — David T Karst
(74) *Attorney, Agent, or Firm* — King & Partners, PLC

(57) ABSTRACT

One-component electromagnetic curable novel toughened epoxy-hybrid structural adhesives, generally including: (a) a bisphenol A liquid epoxy resin, (b) a bisphenol F liquid epoxy resin, (c) a bisphenol A solid epoxy resin, (d) a novel toughening agent, (e) one or more mineral fillers, and (f) a curing agent. The structural adhesives of the present invention can be cured within seconds and are useful for a plurality of applications, including bonding OEM closure panel components, such as doors, hoods, fenders, etcetera.

14 Claims, 11 Drawing Sheets

(51) Int. Cl.
*C08G 59/54* (2006.01)
*C08K 3/04* (2006.01)
*C08K 3/36* (2006.01)
*C08L 75/04* (2006.01)

(52) U.S. Cl.
CPC .............. *C08G 59/50* (2013.01); *C08L 75/04* (2013.01); *C09J 2301/408* (2020.08); *C09J 2301/416* (2020.08)

(58) Field of Classification Search
USPC .......................................................... 523/415
See application file for complete search history.

(56) References Cited

U.S. PATENT DOCUMENTS

| | | | |
|---|---|---|---|
| 4,299,942 | A | 11/1981 | Piestert et al. |
| 4,766,183 | A | 8/1988 | Rizk et al. |
| 4,803,108 | A | 2/1989 | Leuchten et al. |
| 5,063,103 | A | 11/1991 | Sugawara et al. |
| 5,308,895 | A | 5/1994 | Gan et al. |
| 5,574,123 | A | 11/1996 | Bock et al. |
| 5,589,554 | A | 12/1996 | Hiraoka |
| 6,486,256 | B1 | 11/2002 | Tarbutton et al. |
| 6,586,089 | B2 | 7/2003 | Golden |
| 6,646,354 | B2 | 11/2003 | Cobbley et al. |
| 7,049,388 | B2 | 5/2006 | Boriack et al. |
| 7,255,549 | B2 | 8/2007 | Hadley |
| 7,311,972 | B2 | 12/2007 | Yan et al. |
| 7,511,097 | B2 | 3/2009 | Frick et al. |
| 7,723,405 | B2 | 5/2010 | Braun et al. |
| 7,910,656 | B2 | 3/2011 | Lutz et al. |
| 8,076,424 | B2 | 12/2011 | Kramer et al. |
| 8,097,119 | B2 | 1/2012 | Eagle et al. |
| 8,153,229 | B2 | 4/2012 | Kousaka et al. |
| 8,585,861 | B2 | 11/2013 | Eagle et al. |
| 8,729,197 | B2 | 5/2014 | Kropp |
| 8,858,752 | B2 | 10/2014 | Lutz et al. |
| 9,181,463 | B2 | 11/2015 | Lutz et al. |
| 9,371,435 | B2 | 6/2016 | Palmer, Jr. et al. |
| 9,567,262 | B2 | 2/2017 | Nicoleau et al. |
| 9,676,887 | B2 | 6/2017 | Lutz et al. |
| 9,976,027 | B2 | 5/2018 | Okamoto |
| 10,400,140 | B2 | 9/2019 | Schumann et al. |
| 10,508,204 | B2 | 12/2019 | Odarczenko et al. |
| 10,538,637 | B2 | 1/2020 | Kamae et al. |
| 10,815,405 | B2 | 10/2020 | Haag et al. |
| 11,274,236 | B2 | 3/2022 | Auvil et al. |
| 12,110,425 | B2 | 10/2024 | Veeraraghavan et al. |
| 2008/0251757 | A1 | 10/2008 | Yamamoto et al. |
| 2009/0099312 | A1 | 4/2009 | Weber |
| 2012/0121913 | A1 | 5/2012 | Chang et al. |
| 2014/0147677 | A1 | 5/2014 | Lutz et al. |
| 2015/0184039 | A1 | 7/2015 | Lutz et al. |
| 2019/0153182 | A1 | 5/2019 | Veeraraghavan |
| 2019/0284454 | A1* | 9/2019 | Eagle ...................... C08L 21/00 |
| 2020/0079977 | A1 | 3/2020 | Miller et al. |
| 2020/0231849 | A1 | 7/2020 | Auvil et al. |
| 2021/0130663 | A1 | 5/2021 | Koch et al. |
| 2021/0163665 | A1 | 6/2021 | Gallo |
| 2021/0198538 | A1 | 7/2021 | Desai et al. |

FOREIGN PATENT DOCUMENTS

| | | |
|---|---|---|
| EP | 1141071 | 9/2005 |
| JP | 5856243 | 12/2015 |
| RU | 2718831 | 4/2020 |
| WO | WO 2019/079026 | 4/2019 |
| WO | WO 2019/099227 | 5/2019 |
| WO | WO 2020/225638 | 11/2020 |

* cited by examiner

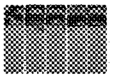
Fig. a1: Electrogalvanized (60E) Steel
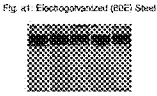
Fig. a2: Aluminum (Al6022)
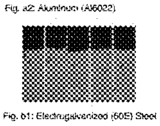
Fig. b1: Electrogalvanized (60E) Steel
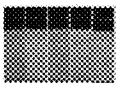
Fig. b2: Aluminum (Al6022)

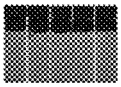
Fig. c1: Electrogalvanized (60E) Steel
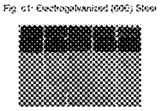
Fig. c2: Aluminum (Al6022)
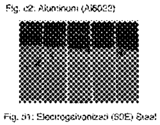
Fig. d1: Electrogalvanized (60E) Steel
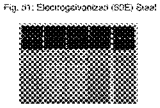
Fig. d2: Aluminum (Al6022)

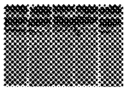
Fig. e1: Electrogalvanized (60E) Steel
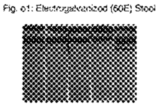
Fig. e2: Aluminum (Al6022)
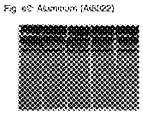
Fig. f1: Electrogalvanized (60E) Steel
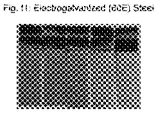
Fig. f2: Aluminum (Al6022)

Fig. g1: Electrogalvanized (60E) steel
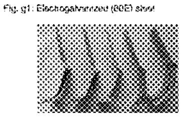
Fig. g2: Electrogalvanized (60E) steel
Fig. g3: Aluminum (Al6022)
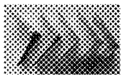
Fig. g4: Aluminum (Al6022)

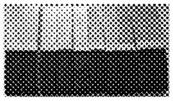
Fig. h1 Electrogalvanized (60E) steel
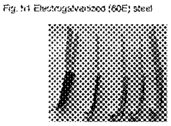
Fig. h2: Electrogalvanized (60E) steel
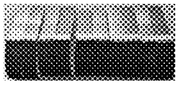
Fig. h3: Aluminum (Al6022)
Fig. h4: Aluminum (Al6022)

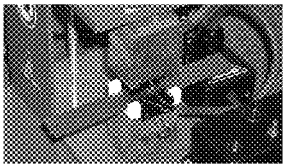
Fig. 2 Electromagnetic cure instrument (Miller)
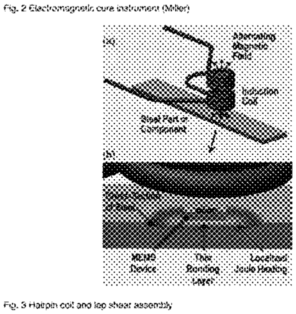
Fig. 3 Hairpin coil and lap shear assembly

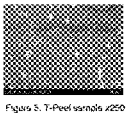
Figure 5: T-Peel sample x250
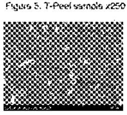
Figure 6: T-Peel sample x500
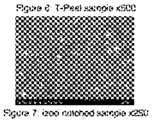
Figure 7: Izod notched sample x250
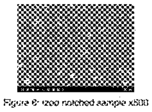
Figure 8: Izod notched sample x500

ELECTROMAGNETIC CURABLE NOVEL TOUGHENED EPOXY-HYBRID STRUCTURAL ADHESIVES AND APPLICATIONS USING THE SAME

CROSS-REFERENCE TO RELATED APPLICATIONS

This application is a continuation of U.S. application Ser. No. 17/403,941, entitled "ELECTROMAGNETIC CURABLE NOVEL TOUGHENED EPOXY-HYBRID STRUCTURAL ADHESIVES AND APPLICATIONS USING THE SAME," filed Aug. 17, 2021—which is hereby incorporated herein by reference in its entirety, including all references cited therein.

STATEMENT REGARDING FEDERALLY SPONSORED RESEARCH OR DEVELOPMENT

Not applicable.

REFERENCE TO A SEQUENCE LISTING Not applicable.

BACKGROUND OF THE INVENTION

1. Field of the Invention

The present invention relates in general to structural adhesives, and, more particularly, to one-component electromagnetic curable novel toughened epoxy-hybrid structural adhesives. The structural adhesives of the present invention can be cured within seconds and are useful for a plurality of applications, including bonding original equipment manufacturer (OEM) closure panel components, such as doors, hoods, fenders, etcetera.

2. Background Art

Epoxy resins are the material of choice for numerous and highly diverse applications due to their versatile chemistry, unique combination of properties and adaptability to various process requirements. Demand of dissimilar substrate and softer metal bonding along with structural strength properties has been growing in OEM closure panel applications due to an increase in safety standards. This has also led to the requirement of spot bonding which heats small segments of the materials to be joined. Spot bonding ensures precise energy inputs for each panel, and small heat affected zones minimize total panel elongation. Clamping is not needed when bonding steel panels, which reduces stresses and distortion. Spot bonding helps for panel shipment, moving from one location to another location without distortion before it gets assembled in the vehicle for the full cure process. Currently, the requirements for conventional 2-component acrylic adhesives green strength or handling strength before assembled parts are moved from one location to another or before they go to an E-coat oven to get full cure is between 3 and 5 MPa.

Current OEM closure panel applications use either PVC plastisol, conventional 2-component acrylic adhesives, or high rigid epoxy adhesives for metal-to-metal bonding. However, PVC plastisol does not provide structural strength properties and high rigid epoxy adhesives do not provide the required toughness and t-peel properties after spot bonding. Furthermore, conventional toughened epoxy structural adhesives are not cured with spot bonding by electromagnetic fields and cause panel movement while shipping from one location to another location. Because of the insufficient properties of currently available adhesives, more frequently irregular dimensional closure panels are produced and ultimately leads to repair in OEM plants. The Applicant has developed novel toughened epoxy-hybrid structural adhesives which cure electromagnetically, develop handling strength min. 4 MPa, and cure fully in the E-coat process and achieve full structural properties of toughness and t-peel strength. This epoxy-hybrid adhesive shows good adhesion character to similar substrates, dissimilar substrates, and softer metals as well. It also bonds through different types of lubricants used in OEM closure panel applications.

Being a "softer" metal, aluminum's use in auto and truck body construction is becoming increasingly popular. The aluminum industry estimates that the average aluminum content level will reach 500 pounds per vehicle by 2025 (up from approximately 390 pounds in 2015). Aluminum has many advantages, including making vehicles lighter weight and more fuel efficient. However, aluminum is sensitive to temperature variation and will distort when exposed to extreme heat. One of the common problems when aluminum is used to fabricate an auto body hood, is distortion due to heat. Notably, even a small amount of distortion in the aluminum sheet detracts from the vehicle's aesthetics.

Hood and other vehicle closure parts cause distortion during the electro-coating process which involves curing of adhesives and sealers reaching temperatures as high as 200 °C. One way to prevent this distortion is by utilizing an early spot bonding along hemmed edges (the outer panel is folded over the inner panel and joined with adhesive). However, if the bond is not secure, it can result in relative movement between the inner and outer panels, thereby causing the entire closure to become dimensionally unstable.

In accordance with the present invention, choosing the right adhesive chemistry offers a real world, practical solution. Conventional two-part acrylic adhesives solve the problem to some extent, but they undesirably require two different pump stations. Acrylic adhesives also have pot life issues, mix ratio issues, obnoxious odor issues, and adhesive applied parts need to be hemmed immediately—creating manufacturing complications. Conventional one-part epoxies do not allow the hemmed area to gain strength until the part has been heated and entirely cooled.

The electromagnetic curable novel toughened epoxy-hybrid structural adhesives of the present invention provide a complete solution to the problem. After the adhesive is applied to the outer panel, it is hemmed with the inner panel and spot cured with electromagnetic coils to create spot bonding. This provides significant handling strength, holding outer and inner panels securely in place. Assembled parts can be shipped to another location without causing slippage or loss of contact points along the hemline. The closure's dimensional stability is also improved. While panels will still expand and deform when exposed to high heat during electro-coating, the spot bond will absorb substrate expansion and the remaining adhesive gets cured and creates a strong bond. Another advantage of spot bonding, is that it reduces "spring back," which is the tendency for metal to unfold along the bent edge. The elastic modulus for aluminum is one-third that of steel, therefore, aluminum "spring back" will be three times that of steel.

These and other objects of the present invention will become apparent in light of the present specification, claims, and drawings.

SUMMARY OF THE INVENTION

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

The present invention is directed to a one-component structural adhesive, comprising, consisting essentially of, and/or consisting of: (a) a bisphenol A liquid epoxy resin; (b) a bisphenol F liquid epoxy resin; (c) a bisphenol A solid epoxy resin; (d) a toughening agent; (e) at least one filler material; (f) a curing agent; and wherein the structural adhesive is electromagnetically curable. The structural adhesives of the present invention can be cured within seconds and are useful for a plurality of applications, including bonding OEM closure panel components such as doors, hoods, fenders etcetera.

In a preferred embodiment of the present invention, the weight ratio of the bisphenol A liquid epoxy resin to the bisphenol F liquid epoxy resin to the bisphenol A solid epoxy resin is approximately 4:5:1 by weight.

In another preferred embodiment of the present invention, the bisphenol A liquid epoxy resin comprises a diglycidyl ether of bisphenol A.

In yet another preferred embodiment of the present invention, the bisphenol A liquid epoxy resin is present from approximately 30 percent to approximately 50 percent by weight of the structural adhesive.

In one embodiment of the present invention, the bisphenol F liquid epoxy resin comprises a diglycidyl ether of bisphenol F.

In a preferred embodiment of the present invention, the bisphenol F liquid epoxy resin is present from approximately 40 percent to approximately 60 percent by weight of the structural adhesive.

In another preferred embodiment of the present invention, the bisphenol A solid epoxy resin comprises a bisphenol A unmodified solid epoxy resin.

In yet another preferred embodiment of the present invention, the bisphenol A solid epoxy resin is present from approximately 5 percent to approximately 15 percent by weight of the structural adhesive.

In one preferred aspect of the present invention, the toughening agent comprises an epoxy terminated polyurethane interpenetrating network represented by the following chemical structure:

$$A_1—R_1—A_2$$

wherein $A_1$ is represented by the following chemical structure:

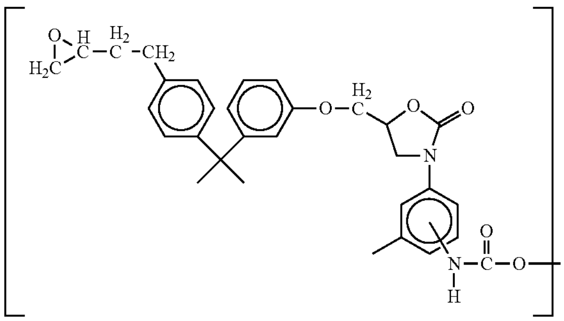

wherein $R_1$ comprises an alkyl, cycloalkyl, polycycloalkyl, heterocycloalkyl, aryl, alkaryl, aralkyl, alkoxy, alkanoyl, aroyl, alkenyl, alkynyl and/or cyano group containing approximately 1 to approximately 75 carbon atoms, an oligomer, and/or a polymer; and wherein $A_2$=$A_1$ and/or comprises an alkyl, cycloalkyl, polycycloalkyl, heterocycloalkyl, aryl, alkaryl, aralkyl, alkoxy, alkanoyl, aroyl, alkenyl, alkynyl and/or cyano group containing approximately 1 to approximately 35 carbon atoms, an oligomer, and/or a polymer.

In another preferred embodiment of the present invention, the toughening agent comprises an epoxy terminated polyurethane interpenetrating network represented by the following chemical structure:

$$A_1—R_1—A_2$$

wherein $A_1$ is represented by the following chemical structure:

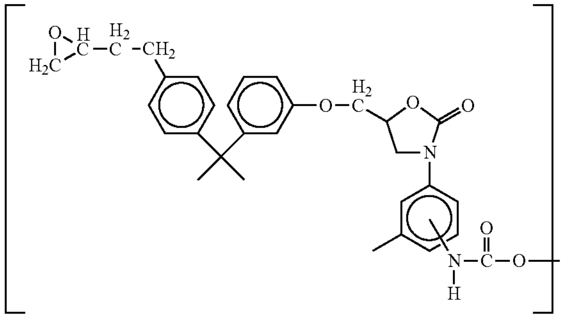

wherein $R_1$ comprises an alkyl, alkenyl, and/or alkynyl group containing approximately 1 to approximately 36 carbon atoms, an oligomer, and/or a urethane polymer; and wherein $A_2$=$A_1$.

In yet another preferred embodiment of the present invention, the toughening agent is present from approximately 5 percent to approximately 15 percent by weight of the structural adhesive.

In a preferred embodiment of the present invention, the at least one filler material comprises fumed silica, carbon black, and/or calcium metasilicate.

In another preferred embodiment of the present invention, the least one filler material is present from approximately 2 percent to approximately 10 percent by weight of the structural adhesive.

In yet another preferred embodiment of the present invention, the curing agent comprises a modified imidazole curing agent and/or a latent amine curing agent.

Preferably, the modified imidazole curing agent is present from approximately 2 percent to approximately 7 percent by weight of the structural adhesive.

In another preferred aspect of the present invention, the latent amine curing agent is present from approximately 6 percent to approximately 10 percent by weight of the structural adhesive.

In a preferred embodiment of the present invention, spot bonding the structural adhesive (190 °C/4 sec.) using an electromagnetic field curing schedule, results in an approximately 3 to approximately 7 MPa shear strength.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be further understood that the invention is not necessarily limited to the particular embodiments illustrated herein.

The invention will now be described with reference to the drawings wherein.

Figure 4:
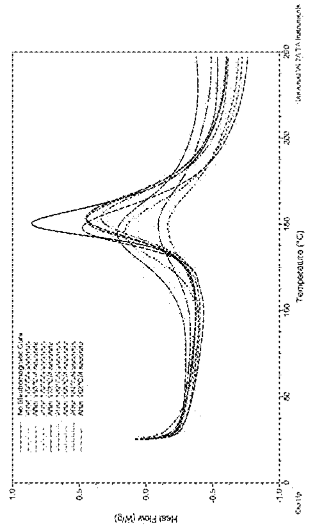
Figure 10:
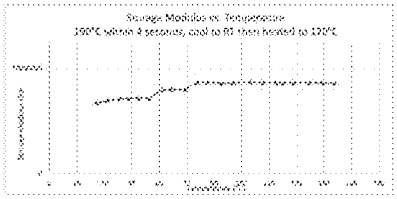

FIGS. a1, a2, b1, b2, c1, c2, d1, d2, e1, e2, f1, f2, g1, g2, g3, g4, h1, h2, h3, and h4 of the drawings are test result photographs of the present invention;

FIGS. 2 and 3 show an electromagnetic cure instrument in accordance with the present invention;

FIG. 4 is a two-dimensional plot showing heat flow as a function of temperature;

FIGS. 5-8 are of the drawings are scanning electron microscope image test results of the present invention;

FIG. 9 is a two-dimensional plot showing storage modulus as a function of temperature; and FIG. 10 is a two-dimensional plot showing storage modulus as a function of temperature.

DETAILED DESCRIPTION OF THE INVENTION

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters. In addition, it will be understood that the drawings are merely schematic representations of one or more embodiments of the invention, and some of the components may have been distorted from their actual scale for purposes of pictorial clarity.

As will be discussed and shown experimentally hereinbelow, the present invention is directed to unique one-component electromagnetic curable novel toughened epoxy-hybrid structural adhesives. The structural adhesives of the present invention can be cured within seconds and are useful for a plurality of applications, including bonding original equipment manufacturer (OEM) closure panel components, such as doors, hoods, fenders, etcetera-including those having metal forming lubricants.

Figure 1:
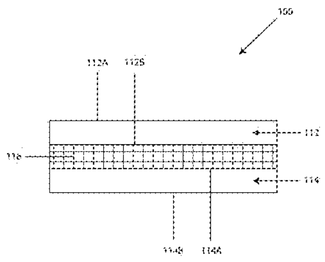
FIG. 1 of the drawings is a cross-sectional schematic representation of a substrate/component assembly (e.g., upper and lower auto hood sheets) associated with a cured structural adhesive product in accordance with the present invention.

Referring now to the drawings, and to FIG. 1 in particular, component assembly 100 is shown, which generally comprises first substrate 112 having first surface 112A and second surface 112B, second substrate 114 having first surface 114A and second surface 114B, and structural adhesive 116. It will be understood that component assembly 100 may comprise, for illustrative purposes only, a vehicle component or portion thereof (e.g., a door, a hood, a fender, a trunk, an interface, etcetera). Indeed, the structural adhesives of the present invention are suitable for a plurality of applications.

First substrate 112 may be fabricated from any one of a number of materials, such as, for example, steel, steel electrogalvanized with zinc, steel hot dipped galvanized with zinc, aluminum, metal alloys, d-block metals, and combinations thereof. First substrate 112 is preferably fabricated from a sheet having a thickness ranging from approximately 0.25 mm to approximately 5.00 mm, and more preferably ranging from approximately 0.75 mm to approximately 2.50 mm. Of course, the thickness of the substrate will depend largely upon the particular application of the assembly. While particular substrate materials have been disclosed, for illustrative purposes only, it will be understood that numerous other substrate materials are likewise contemplated for use—so long as the materials exhibit appropriate physical properties, such as strength, to be able to operate effectively in conditions of intended use. Indeed, substrate assemblies in accordance with the present invention can be, during normal operation, exposed to extreme temperature variation, as well as substantial UV radiation, emanating primarily from the sun.

Second substrate 114 may be fabricated from similar and/or dissimilar materials as that of first substrate 112. Second substrate 114 is preferably fabricated from a sheet having a thickness ranging from approximately 0.25 mm to approximately 5.00 mm, and more preferably ranging from approximately 0.75 mm to approximately 2.50 mm.

As will be discussed herein below, structural adhesive 116 is preferably formed from a one-component electromagnetically curable novel toughened epoxy-hybrid composition, comprising: (a) a bisphenol A liquid epoxy resin; (b) a bisphenol F liquid epoxy resin; (c) a bisphenol A solid epoxy resin; (d) a toughening agent; (e) at least one filler material; and (f) a curing agent.

In accordance with the present invention, structural adhesive 116 includes a bisphenol A type liquid epoxy resin. In one embodiment of the present invention, the bisphenol A type liquid epoxy resin comprises a diglycidyl ether of bisphenol A. Non-limiting examples of bisphenol A type liquid resins include DER 330 (Olin Corporation), DER 331 (Olin Corporation), DER 332 (Olin Corporation), DER 383 (Olin Corporation), DER 3171 (Olin Corporation), DER 317 (Olin Corporation), DER 321 (Olin Corporation), DER 3212 (Olin Corporation), DER 322 (Olin Corporation), DER 323 (Olin Corporation), DER 324 (Olin Corporation), DER 325 (Olin Corporation), DER 326 (Olin Corporation), DER 3274 (Olin Corporation), DER 333 (Olin Corporation), DER 3401 (Olin Corporation), DER 346 (Olin Corporation), DER 362 (Olin Corporation), and EPON 825 (Miller-Stephenson). Preferably, the bisphenol A type liquid epoxy resin is present from approximately 30 percent to approximately 50 percent by weight of the structural adhesive.

In a preferred embodiment of the present invention, structural adhesive 116 includes a bisphenol F type liquid epoxy resin. In one embodiment of the present invention, the bisphenol F type liquid epoxy resin comprises a diglycidyl ether of bisphenol F. Non-limiting examples of bisphenol F type liquid resins include DER 354 (Olin Corporation) and YDF-170 (Kukdo Corporation). Preferably, the bisphenol F type liquid epoxy resin is present from approximately 40 percent to approximately 60 percent by weight of the structural adhesive.

In one embodiment of the present invention, structural adhesive 116 includes a bisphenol A type solid epoxy resin. Non-limiting examples of bisphenol A type solid epoxy resins include RAR 1001 (Huntsman) and YD-011H (Kukdo Corporation). Preferably, the bisphenol F type liquid epoxy resin is present from approximately 5 percent to approximately 15 percent by weight of the structural adhesive.

In one preferred aspect of the present invention, structural adhesive 116 includes a toughening agent comprises an epoxy terminated polyurethane interpenetrating network represented by the following chemical structure:

$$A_1—R_1—A_2$$

wherein $A_1$ is represented by the following chemical structure:

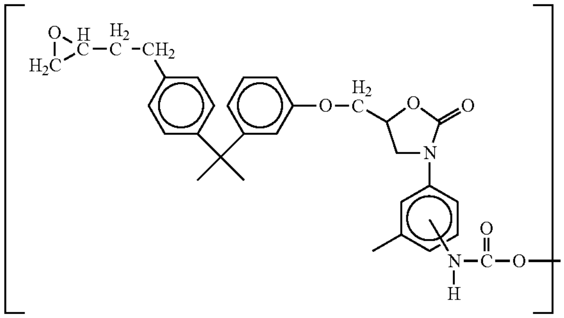

wherein $R_1$ comprises an alkyl, cycloalkyl, polycycloalkyl, heterocycloalkyl, aryl, alkaryl, aralkyl, alkoxy, alkanoyl, aroyl, alkenyl, alkynyl and/or cyano group containing approximately 1 to approximately 75 carbon atoms, an oligomer, and/or a polymer; and wherein $A_2$═$A_1$ and/or comprises an alkyl, cycloalkyl, polycycloalkyl, heterocycloalkyl, aryl, alkaryl, aralkyl, alkoxy, alkanoyl, aroyl, alkenyl, alkynyl and/or cyano group containing approximately 1 to approximately 35 carbon atoms, an oligomer, and/or a polymer.

In another preferred embodiment of the present invention, the toughening agent comprises an epoxy terminated polyurethane interpenetrating network represented by the following chemical structure:

$$A_1—R_1—A_2$$

wherein $A_1$ is represented by the following chemical structure:

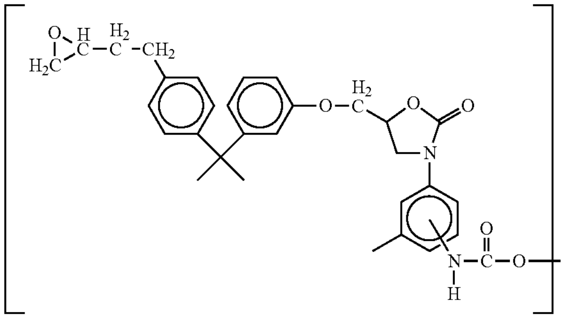

wherein $R_1$ comprises an alkyl, alkenyl, and/or alkynyl group containing approximately 1 to approximately 36 carbon atoms, an oligomer, and/or a urethane polymer; and wherein $A_2$═$A_1$ (Uniseal IPN11, C=36). Preferably, the toughening agent is present from approximately 5 percent to approximately 15 percent by weight of the structural adhesive.

The above-identified toughening agents (e.g., epoxy terminated polyurethane interpenetrating network and/or its precursors) are available from common commercial chemical vendors, such as Sigma-Aldrich Chemical Co., of St. Louis, Missouri.

In one embodiment of the present invention, structural adhesive 116 includes one or more filler materials (e.g., fumed silica, carbon black, and/or calcium metasilicate). Non-limiting examples of filler materials include fumed silica (Cabosil TS-720, Cabot Corporation), carbon black (Regal 400R, Cabot Corporation), and calcium metasilicate (Vansil W-40, Cabot Corporation). Preferably, the filler materials are present from approximately 2 percent to approximately 10 percent by weight of the structural adhesive.

In one aspect of the present invention, structural adhesive 116 includes one or more curing agents, such as, but not limited to, modified imidazole curing agents and/or a latent amine curing agents. Non-limiting examples of curing agents include dicyandiamide (Omicure DDA-10, Emerald Materials), 1-Phenyl-3,3 dimethyl urea (Amicure UR 7/10, Evonik Corporation, modified imidazole (Technicure LC-80, ACCI specialty materials, 4,4' Methylene bis(phenyl dimethyl urea) (Omicure U52, Emerald Materials), 2,4 Toluene bis dimethyl urea (Omicure U24, Emerald Materials), and cycloaliphatic substituted urea (Omicure U35M, Emerald Materials). Preferably, the modified imidazole curing agent is present from approximately 2 percent to approximately 7 percent by weight of the structural adhesive, and preferably the latent amine curing agent is present from approximately 6 percent to approximately 10 percent by weight of the structural adhesive.

Provided below are chemical structures for certain curing agents:

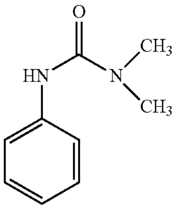

Amicure UR 7/10

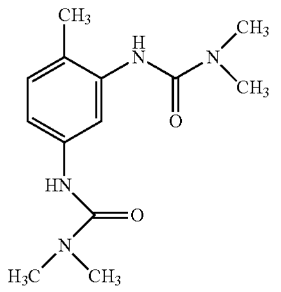

Omicure U24

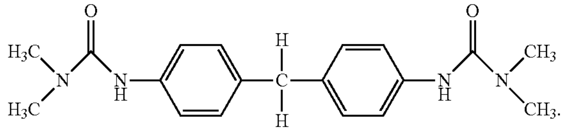

Omicure U52

Preparation of Adhesive

In a clean vessel, solid bisphenol A resin and diglycidyl ether of bisphenol A resin were melted together at 200 °F.

Next, Uniseal IPN11 was added and mixed to generate a uniform clear liquid. Then, diglycidyl ether of bisphenol F resin was added. The ingredients were mixed together until they formed a uniform mixture. The mixture was cooled to 100 °F. Then, fumed silica and carbon black were added and mixed for 10 minutes to generate a uniform paste. Next, calcium metasilicate was added and mixed for another 10 minutes to, once again, generate a uniform paste. This mixture was agitated for 20 minutes under vacuum (28" Hg). Dicyandiamide, Amicure UR 7/10, and modified imidazole were added and mixed together for 10 minutes. This mixture was further agitated for 20 minutes under vacuum (28" Hg). The resulting paste was uniform.

TABLE 1

| Raw material | A1 | A2 | A3 | A4 | A5 | A6 | A7 | A8 | A9 | A10 |
|---|---|---|---|---|---|---|---|---|---|---|
| YD-011H | 10 | 10 | 10 | 10 | 10 | 10 | 10 | 10 | 10 | 10 |
| DER 331 | 40 | 40 | 40 | 40 | 40 | 40 | 40 | 40 | 40 | 40 |
| YDF170 | 50 | 50 | 50 | 50 | 50 | 50 | 50 | 50 | 50 | 50 |
| Uniseal IPN11 | 0 | 15 | 15 | 15 | 0 | 15 | 0 | 15 | 0 | 15 |
| Cabosil TS720 | 3 | 3 | 3 | 3 | 3 | 3 | 3 | 3 | 3 | 3 |
| Vansil W-40 | 5 | 5 | 5 | 5 | 5 | 5 | 5 | 5 | 5 | 5 |
| Regal 400 R | 1 | 1 | 1 | 1 | 1 | 1 | 1 | 1 | 1 | 1 |
| Omicure DDA-10 | 8 | 8 | 8 | 8 | 8 | 8 | 8 | 8 | 8 | 8 |
| Amicure UR 7/10 | 1 | 1 | 1 | 1 | 1 | 1 | 1 | 1 | 1 | 1 |
| Omicure U52 | 0 | 0 | 0 | 0 | 5 | 5 | 0 | 0 | 0 | 0 |
| Technicure LC80 | 5 | 0 | 5 | 2 | 0 | 0 | 0 | 0 | 0 | 0 |
| Omicure U35M | 0 | 0 | 0 | 0 | 0 | 0 | 5 | 5 | 0 | 0 |
| Omicure U24 | 0 | 0 | 0 | 0 | 0 | 0 | 0 | 0 | 5 | 5 |

Diglycidyl ether of Bisphenol-A resin (DER 331) from Olin Corporation.

Diglycidyl either of Bisphenol-F resin (YDF-170) from Kukdo Corporation.

Solid Bisphenol-A epoxy resin (YD-011H) from Kukdo Corporation.

Uniseal IPN11 from Uniseal Inc.

Dicyandiamide (Omicure DDA-10) from Emerald Materials.

Fumed silica (Cabosil TS-720) from Cabot Corporation.

Carbon Black (Regal 400R) from Cabot Corporation.

Calcium metasilicate (Vansil W-40) from Vanderbilt Corporation, Cabot Corporation.

1-Phenyl-3,3 dimethyl urea (Amicure UR 7/10) from Evonik Corporation.

Modified imidazole (Technicure LC-80) from ACCI specialty materials.

4,4' Methylene bis (phenyl dimethyl urea) (Omicure U52) from Emerald Materials.

2,4 Toluene bis dimethyl urea (Omicure 24) from Emerald Materials.

Cycloaliphatic substituted urea (Omicure U35M) from Emerald Materials.

Preparation of Test Specimens

For Lap shear strength (ASTM D 1002), T-Peel strength (ASTM D 1876) testing substrates include 0.78 mm thickness electrogalvanized (60E) steel, 0.82 mm thickness hot-dipped galvanized steel (HDG), 0.78 mm thickness cold rolled steel (CRS), 0.9 mm thickness aluminum 6022 type & 0.95 mm aluminum 6111 type received from ACT. Ferrocote 6130 lubricant for Steel & Drycote 2-90 from Quaker Chemical Company was used on the Aluminum substrates.

Lap shear specimen (ASTM D 1002): Composition material applied on 1"×4" size substrates, bonding area was 1"×0.5", 0.008" bond line, assembled similar and dissimilar substrate. Cured electromagnetically to get temp. 190 °C/4 sec. and 180 °C/20 min., tested at RT by using speed of 12.5 mm/minute test method.

T-Peel Resistance (ASTM D 1876): Composition material applied on 1"×4" size substrates, bonding area was 1"×4", 0.008" bond line, assembled similar and dissimilar substrates. Cured electromagnetically to get temp. 190 °C/4 sec. and 180 °C/20 min, tested at RT by using speed 500 mm/minute test method.

Test Results

Green strength development after electromagnetic cure for adhesive formulation A1-A10: After cured electromagnetically at temp. 190 °C/4 sec., tested at RT. Lap shear strength (MPa) is provided in Table 2 below.

TABLE 2

| Adhesive | Lap shear strength (MPa) (60E-60E substrate) | Lap shear strength (MPa) (Al6022-Al6022 substrate) |
|---|---|---|
| A1 | 1.5 | 1.6 |
| A2 | 0.07 | 0.5 |
| A3 | 5.10 | 5.21 |
| A4 | 1.90 | 2 |
| A5 | 1.1 | 1.2 |
| A6 | 1.2 | 1.2 |
| A7 | 0.5 | 0.5 |
| A8 | 0.1 | 0.2 |
| A9 | 1.3 | 1.3 |
| A10 | 1.1 | 1.1 |

During Lap shear testing, Adhesive A1, A5, A9 showed adhesive failure and brittleness. A2, A7, A8, and A10 showed cure failure and were wet. A3 showed cohesive failure and no tackiness. A4, A6 showed not cured fully, tacky and cohesive failure.

As is shown in FIGS. a1 and a2, adhesive formulations A1, A5 and A9 showed adhesive failure mode and adhesive film was brittle.

As is shown in FIGS. b1 and b2, adhesive formulations A1, A5 and A9 showed cure failure and adhesive film was not gelled, wet condition only.

As is shown in FIGS. c1 and c2, adhesive formulation A3 showed cohesive failure mode and adhesive film was not tacky.

As is shown in FIGS. d1 and d2, adhesive formulations A4 and A6 showed cure failure and adhesive film was tacky and cohesive failure mode.

As is shown in FIG. 2, the present invention utilizes an electromagnetic cure instrument. As is also shown in FIG. 3, the present invention utilizes a hairpin coil and lap shear test assembly.

In order to get temp. 190 °C, Power level #1 (0.5kW, 10sec) and Power level #2 (0.3 KW, 9 sec.) were used, then maintained for 4 sec. at 190 °C and by trial-and-error method above the power level current and time was optimized.

Conventional 2-Component Acrylic Adhesive Green Strength Development RT Cure:

Conventional 2-component acrylic adhesive (4:1 mix ratio) had an objectionable odor and after 1 hr cured at RT, tested at RT and Lap shear strength (MPa) is provided below in table 2a.

TABLE 2a

| Cure Time (min.) | Lap shear strength (MPa) (60E-60E substrate) | Lap shear strength (MPa) (Al6022-Al6022 substrate) |
|---|---|---|
| 30 min. | 0.02 | 0.01 |
| 60 min. | 4.5 | 4.1 |

During Lap shear testing, after 30 min. cured at RT the material was not cured and tacky. After 60 min. cured at RT, edge of overlap panel found that material was not fully cured and tacky.

Conventional 2-Component Acrylic Adhesive After Full Cure (1 hr RT Cure+oven Cure):

Conventional 2-component acrylic adhesive (4:1 mix ratio) has objectionable odor and after 1 hr cured at RT and then cured at temp. 180 °C/20 min., tested at RT and below table 2b has Lap shear strength (MPa).

TABLE 2b

| Conventional Adhesive | Lap shear strength (MPa) (60E-60E) | Lap shear strength (MPa) (Al6022-Al6022) | T-Peel strength (N/mm) (60E-60E) | T-Peel strength (N/mm) (Al6022-Al6022) |
|---|---|---|---|---|
| 2K Acrylic | 10.5 | 10.2 | 4.3 | 3.5 |

During Lap shear and T-Peel strength testing, all samples exhibited cohesive failures.

Mechanical Properties After Full Cure:

After cured electromagnetically at temp. 190 °C/4 sec. and then cured at temp. 180 °C/20 min., Electrogalvanized (60E) steel and aluminum 6022 are used for this example.

In order to get temp. 190 °C, power level #1 (0.5 kW, 10 sec) and power level #2 (0.3 kW, 9 sec.) used it, then maintained for 4 sec. at 190 °C and by trial & error method above power level current & time has been optimized. Blue M convection lab ovens used for 180 °C/20 min. cure.

TABLE 3

| Adhesive | Lap shear strength (MPa) (60E-60E) | Lap shear strength (MPa) (Al6022-Al6022) | T-Peel strength (N/mm) (60E-60E) | T-Peel strength (N/mm) (Al6022-Al6022) |
|---|---|---|---|---|
| A1 | 8.30 | 4.5 | 1.00 | 0.5 |
| A2 | 15.08 | 13.2 | 7.20 | 6.4 |
| A3 | 15.12 | 15.33 | 9.12 | 9.46 |
| A4 | 15.05 | 14.8 | 9.00 | 9.4 |
| A5 | 8.5 | 4.7 | 1.1 | 0.6 |
| A6 | 15.1 | 15.1 | 9.08 | 9.35 |
| A7 | 8.2 | 4.2 | 0.9 | 0.5 |
| A8 | 15.08 | 14.9 | 9.05 | 9.32 |
| A9 | 7.8 | 3.2 | 0.7 | 0.7 |
| A10 | 15.0 | 14.7 | 9.05 | 9.2 |

During Lap shear testing, Adhesive A1, A5, A7, and A9 showed adhesive failure and were brittle. All others A2, A3, A4, A6, A8 and A10 showed cohesive failures. During T-Peel testing, Adhesive A1, A5, A7, A9 showed adhesive failure and were brittle. All others A2, A3, A4, A6, A8 and A10 showed cohesive failures.

As is shown in FIGS. e1 and e2, adhesive formulations A1, A5 and A9 showed adhesive failure mode and the adhesive film was brittle.

As is shown in FIGS. f1 and f2, adhesive formulations A2, A3, A4, A6, A8 and A10 showed cohesive failure mode.

As is shown in FIGS. g1, g2, g3, and g4, adhesive formulations A1, A5 and A9 showed cohesive failure mode and the adhesive film was brittle.

As is shown in FIGS. h1-h4, adhesive formulations A2, A3, A4, A6, A8 and A10 showed cohesive failure mode and good curvature on the panel indicates good toughness.

Green Strength Development for Adhesive Formulation A3:

Adhesive A3 composition was further tested by varying electromagnetic cure temperatures and keeping 4 second time constant to find its green strength build up (Table 3a). By lowering the cure temperature and keeping 4 second constant, lap shear strength was expectedly lowered.

Electrogalvanized (60E) steel & Aluminum 6022 are used for this example.

TABLE 3a

| Electromagnetic temp & time | Lap shear strength (MPa) (60E-60E substrate) | Lap shear strength (MPa) (Al6022-Al6022 substrate) |
|---|---|---|
| 25 °C (RT) | 0 | 0 |
| 193 °C/4 sec. | 5.22 | 5.3 |
| 183 °C/4 sec. | 3.88 | 3.93 |
| 178 °C/4 sec. | 2.38 | 2.43 |
| 172 °C/4 sec. | 0.9 | 0.92 |
| 169 °C/4 sec. | 0.65 | 0.66 |
| 166 °C/4 sec. | 0.46 | 0.48 |
| 164 °C/4 sec. | 0.1 | 0.1 |
| 162 °C/4 sec. | 0.04 | 0.04 |

As expected electromagnetic temp. decreased from 190 °C having time constant, Lap shear strength decreases because of curing rate of the adhesive decreased. In this example, Lap shear strength difference between steel and aluminum substrate variation was very minimal.

In order to get different temperatures mentioned in Table 3b, power level #1 and power level #2 was varied for different current and time. Once desired temperature was reached then 4 sec. time was maintained for this example. There was no correlation of power levels to the desired temperature. It was optimized by trial-and-error. Also, it was uncovered that substrate variation did not affect power levels on this instrument.

TABLE 3b

| Electromagnetic temp & time | Power level # 1 & Power level # 2 |
|---|---|
| 25 °C (RT) | 0 |
| 193 °C/4 sec. | Power level #1: 0.5 kw, 10 sec. & Power level #2: 0.3 kw, 9 sec. |
| 183 °C/4 sec. | Power level #1: 0.6 kw, 10 sec. & Power level #2: 0.1 kw, 9 sec. |
| 178 °C/4 sec. | Power level #1: 0.6 kw, 7.5 sec. & Power level #2: 0.2 kw, 11.5 sec. |
| 172 °C/4 sec. | Power level #1: 0.5 kw, 8 sec. & Power level #2: 0.2 kw, 11 sec. |
| 169 °C/4 sec. | Power level #1: 0.5 kw, 7 sec. & Power level #2: 0.2 kw, 12 sec. |
| 166 °C/4 sec. | Power level #1: 0.5 kw, 6.7 sec. & Power level #2: 0.2 kw, 12.3 sec. |
| 164 °C/4 sec. | Power level #1: 0.6 kw, 4.7 sec. & Power level #2: 0.2 kw, 14.3 sec. |
| 162 °C/4 sec. | Power level #1: 0.6 kw, 5 sec. & Power level #2: 0.2 kw, 14 sec. |

Heat of Reaction by DSC (Dynamic Mode):

Heat of reaction by DSC was analyzed for adhesive A3 composition, as well as after electromagnetic curing with different temperature keeping time 4 sec. constant as per table 3a variation.

Table 3c shows that Heat flow (W/g) decreases as the electromagnetic cure temperature increases. Adhesive composition A3 without electromagnetic cure, studied for heat of reaction by DSC found that Heat flow is 0.85 W/g, whereas adhesive composition A3 subjected to electromagnetic cure cycle 193 °C/4 sec. then cooled to room temperature then analyzed for heat of reaction by DSC found that heat flow is only 0.27 W/g. This confirms that composition A3 cured more than 60%. This reflects Green strength development of more than 5 MPa.

As is shown in FIG. 4, DSC was run for the sample size 10-15 mg, 10 °C per minute heat rate from 25 °C to 250 °C.

Mechanical Properties After Full Cure:

Adhesive A3 composition was tested further for multi-substrate bonding, after being electromagnetically cured at temp. 190 °C/4 sec. and 180°C/20 min. tested at RT.

TABLE 4

| Similar Substrate→ Test↓ | 60E-60E | HDG-HDG | CRS-CRS | AL6022-AL6022 | AL6111-AL6111 | AL5182-AI5182 |
|---|---|---|---|---|---|---|
| Lap shear Strength, (MPa) | 15.12 | 15.47 | 18.25 | 15.33 | 16.98 | 16.76 |
| Dissimilar Substrate→ Test↓ | 60E-HDG | 60E-AL6022 | 60E-AL6111 | HDG-AL6022 | HDG-AL6111 | HDG-AL5182 |
| Lap shear Strength, (MPa) | 15.81 | 15.02 | 15.99 | 15.78 | 15.79 | 16.01 |

Table 4 indicates that Lap shear strength is above 15 MPa for all the substrates, including similar and dissimilar substrates. All the substrates showed good cohesive failure mode after the test which indicates that the adhesive has excellent adhesion through oily film and to all the substrates.

TABLE 5

| Substrate→ Test↓ | 60E-60E | HDG-HDG | CRS-CRS | AL6022-AL6022 | AL6111-AL6111 | AL5182-ALS5182 |
|---|---|---|---|---|---|---|
| T-Peel Strength, (N/mm) | 9.12 | 10.57 | 12.90 | 9.46 | 9.77 | 9.63 |
| Delta Energy (J) | 8.64 | 10.06 | 12.28 | 9.08 | 9.31 | 9.11 |
| Dissimilar Substrate→ Test↓ | 60E-HDG | 60E-AL6022 | 60E-AL6111 | HDG-AL6022 | HDG-AL6111 | HDG-AL5182 |
| T-Peel Strength, (N/mm) | 7.98 | 9.29 | 9.73 | 10.01 | 9.33 | 9.28 |
| Delta Energy (J) | 7.60 | 8.85 | 9.27 | 9.53 | 8.89 | 9.01 |

Table 5 indicates that T-peel strength is above 4 N/mm and delta energy absorbed is above 5 J in all of the substrates, including similar and dissimilar substrates as well. All the substrates showed good cohesive failure mode after testing which indicates that the adhesive has good adhesion through oily film and to all the substrates. High peel resistance and delta energy indicates that the adhesive has been highly toughened and has good phase separation.

T-Peel strength tested samples cohesive pattern/facture pattern were viewed with a Scanning Electron Microscope (SEM) with different magnifications and crack propagation noted in the images (See FIGS. 5-6).

Figure 8:
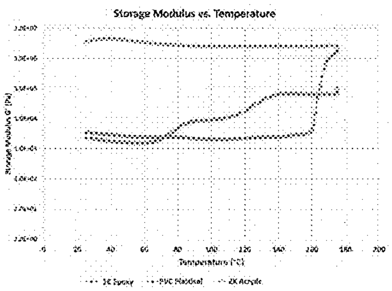

Adhesive cured specimen having dimension of 1"×6", 2 mm thickness, izod specimen was notched as per ASTM D256-10e1 and fracture was generated. These samples were then viewed with a Scanning Electron Microscope (SEM) with different magnifications and crack propagation noted in the images (FIG. 7-8).

T-Peel strength tested specimen fracture pattern and izod specimen notched fracture pattern showed that uniform crack propagation resulted from novel toughening agent in the adhesive composition.

Storage Modulus vs Temperature

FIG. 9 is the typical storage modulus vs temperature for conventional one-component epoxy, one-component PVC plastisol and two-component acrylic adhesives. This was run in TA Rheometer instrument, 1000 micron gap, 3 shear rate and temperature 25 °C to 170 °C at the heating rate of 15 °C per minute. Storage modulus, G' (Pa) was plotted against temp. (°C).

It was discovered that the conventional one-component epoxy adhesive didn't cure and build storage modulus until its on set temp reaches 158-160 °C. Then it started reacting to cure and building storage modulus where no softening occurred.

In the case of the PVC plastisol adhesive, it started fusion to cure and building storage modulus around 70 °C and slowly building storage modulus, but still couldn't meet, RT cured conventional two-component acrylic adhesive storage modulus.

Conventional two-component Acrylic adhesive was cured at RT for 60 min. then it ran at 25 °C to 170 °C at the heating rate 15 °C per minute, measured for storage modulus, G' (Pa), plotted against temp. (°C). It was found that modulus drop from 25 °C to 170 °C was minimal.

The higher storage modulus of the adhesive at elevated temperature prevents distortion in the vehicle closure parts and it ensures no movement between the inner and outer panels, causing the entire closure to become dimensionally unstable.

FIG. 10 shows that adhesive composition A3 was electromagnetically cured at 190 °C/4sec., cooled to RT then it was run at 25 °C to 170 °C at the heating rate 15° C. per minute, measured for storage modulus, G' (Pa), plotted against temp. (°C). It was found that storage modulus didn't drop rather increase while heating. This indicates that no drop in viscosity when reaction to cure occurred and completed full cure. Adhesive composition A3 follows similar path of two-component acrylic thermos-mechanical behavior in TA Rheology instrument.

The foregoing description merely explains and illustrates the invention and the invention is not limited thereto except insofar as the appended claims are so limited, as those skilled in the art who have the disclosure before them will be able to make modifications without departing from the scope of the invention.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etcetera shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etcetera. As a non-limiting example, each range discussed herein can be readily broken down into a lower third, middle third and upper third, etcetera. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

The invention claimed is:

1. A rapid-curing structural adhesive composition, comprising:

a liquid epoxy resin component comprising a bisphenol A liquid epoxy resin and a bisphenol F liquid epoxy resin;

a solid epoxy resin component comprising a bisphenol A solid epoxy resin;

a toughening agent comprising an epoxy-terminated polyurethane interpenetrating network;

at least one filler material;

a curing agent system comprising a modified imidazole curing agent and a latent amine curing agent; and wherein the composition develops a shear strength of approximately 3 to approximately 7 MPa when exposed to an electromagnetic field at approximately 190 °C for approximately 4 seconds.

2. The composition of claim 1, wherein the weight ratio of bisphenol A liquid epoxy resin to bisphenol F liquid epoxy resin to bisphenol A solid epoxy resin is approximately 4:5:1.

3. The composition of claim 1, wherein the epoxy-terminated polyurethane interpenetrating network is represented by the structure A1-R1-A2, wherein A1 is represented by the following structure:

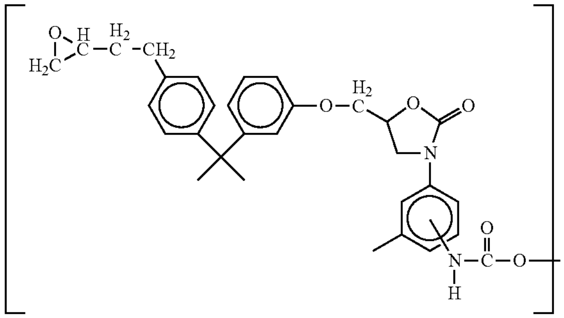

wherein R1 comprises an alkyl group containing approximately 1 to approximately 36 carbon atoms, and wherein A2=A1.

4. The composition of claim 1, wherein the at least one filler material comprises fumed silica, carbon black, calcium metasilicate, or combinations thereof.

5. The composition of claim 1, wherein the modified imidazole curing agent is present from approximately 2 percent to approximately 7 percent by weight of the composition.

6. The composition of claim 5, wherein the curing agent system consists of dicyandiamide, 1-phenyl-3,3 dimethyl urea, and the modified imidazole curing agent.

7. The composition of claim 1, wherein the latent amine curing agent comprises dicyandiamide.

8. The composition of claim 1, wherein the composition develops a T-peel strength of at least approximately 4 N/mm after full cure at 180 °C for approximately 20 minutes.

9. The composition of claim 1, wherein the filler material comprises fumed silica and calcium metasilicate.

10. The composition of claim 1, wherein the bisphenol A liquid epoxy resin comprises a diglycidyl ether of bisphenol A.

11. The composition of claim 1, wherein the bisphenol F liquid epoxy resin comprises a diglycidyl ether of bisphenol F.

12. The composition of claim 1, wherein the composition is stable at room temperature prior to electromagnetic field exposure.

13. The composition of claim 1, wherein the composition exhibits cohesive failure mode in lap shear testing after electromagnetic curing.

14. The composition of claim 1, wherein the composition bonds dissimilar metal substrates with lap shear strength of at least approximately 15 MPa after full cure.

* * * * *